Feb. 20, 1934.  A. H. RINEY ET AL  1,947,616
PIPE LINE
Filed Feb. 29, 1932  2 Sheets-Sheet 1
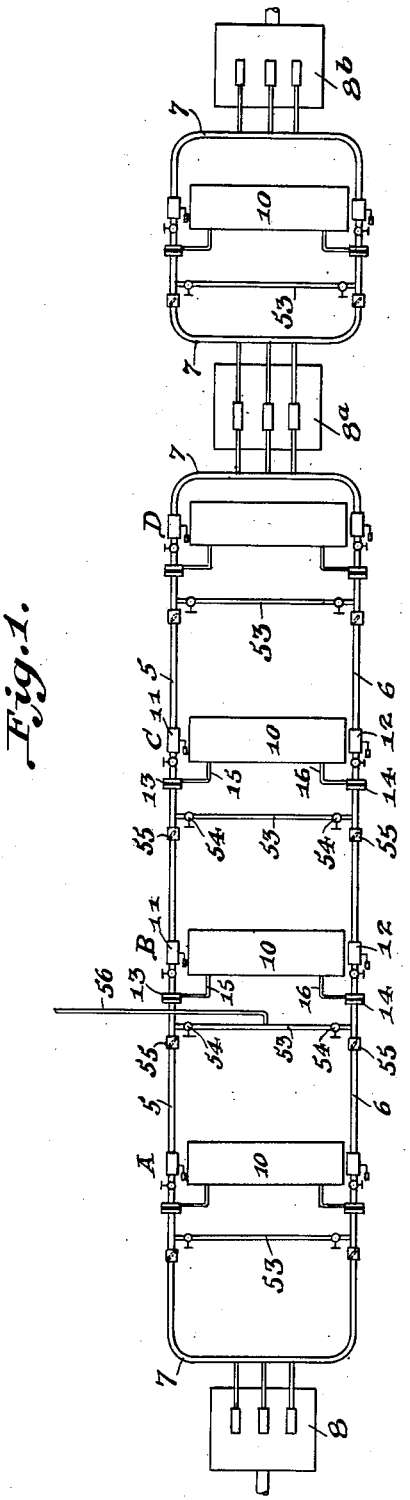
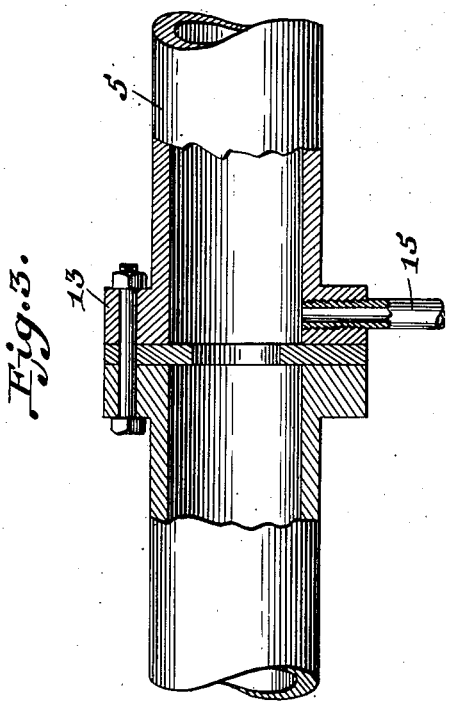
Inventors
*Arthur H. Riney*
AND *Lloyd T. Gibbs*
By *Rolt. E. Barry*
Attorney Patented Feb. 20, 1934

1,947,616

UNITED STATES PATENT OFFICE 1,947,616

PIPE LINE

Arthur H. Riney and Lloyd T. Gibbs, Bartlesville, Okla., assignors to Phillips Petroleum Company, Bartlesville, Okla., a corporation of Delaware Application February 29, 1932. Serial No. 595,906

9 Claims. (Cl. 137—78)

This invention relates to improvements in a system of piping for the distribution of liquids, gases and like fluids and means for controlling the flow of fluid through the pipe lines of the system.

The invention has for its object to provide a system including a multiple pipe arrangement for conducting liquids over long distances wherein the flow of the liquid through the pipes is controlled by automatic pressure responsive valves distributed as desired throughout the length of the pipe line and acting in dependence on variations in pressure difference between the multiple respective pipes to automatically stop the flow of fluid through one pipe, as in the case of stoppage or leakage in the latter, and thereby divert the entire flow over the other of the multiple pipes in the immediate vicinity in which such stoppage or leak occurs.

A further object of the invention is the provision of a system of this type equipped with fluid check devices preventing the back flow of fluid into the damaged pipe section from the portions of the pipe line lying on the downstream side of such damaged section.

A further object of the invention is the provision of a novel arrangement and connection of service branch pipes connected with the multiple pipes of the main supply system in such manner as to maintain the balance of fluid pressure in the multiple pipes and thereby assure reliable functioning of the automatic control devices, irrespective of the number and location of the branch service pipes which may be connected with the main system.

A further object of the invention is the provision of a system including the multiple pipe line control devices wherein the pressure throughout the entire system is maintained at an effective value by the judicious location and the novel connection of booster pumps.

A further object of the invention is the provision of an improved pipe line control device in which the operation of the valves controlling the flow of fluid through the respective multiple pipes is delayed or retarded to such extent as to avoid the closing of the valve in instantaneous response to differential pressures existing in the pipes and thereby prevent the unnecessary closing of the valves in response to slight fluctuations in the pressure between the multiple lines such as may be caused, for instance, by friction in the pipe line, eddy currents and the like.

In the accompanying drawings wherein an approved embodiment of the invention is illustrated:

Fig. 1 is a diagrammatic plan view of a pipe system in accordance with the invention.

Fig. 3 is an enlarged detail section through one of the branch pipes showing the orifice plate.

Figure 2:
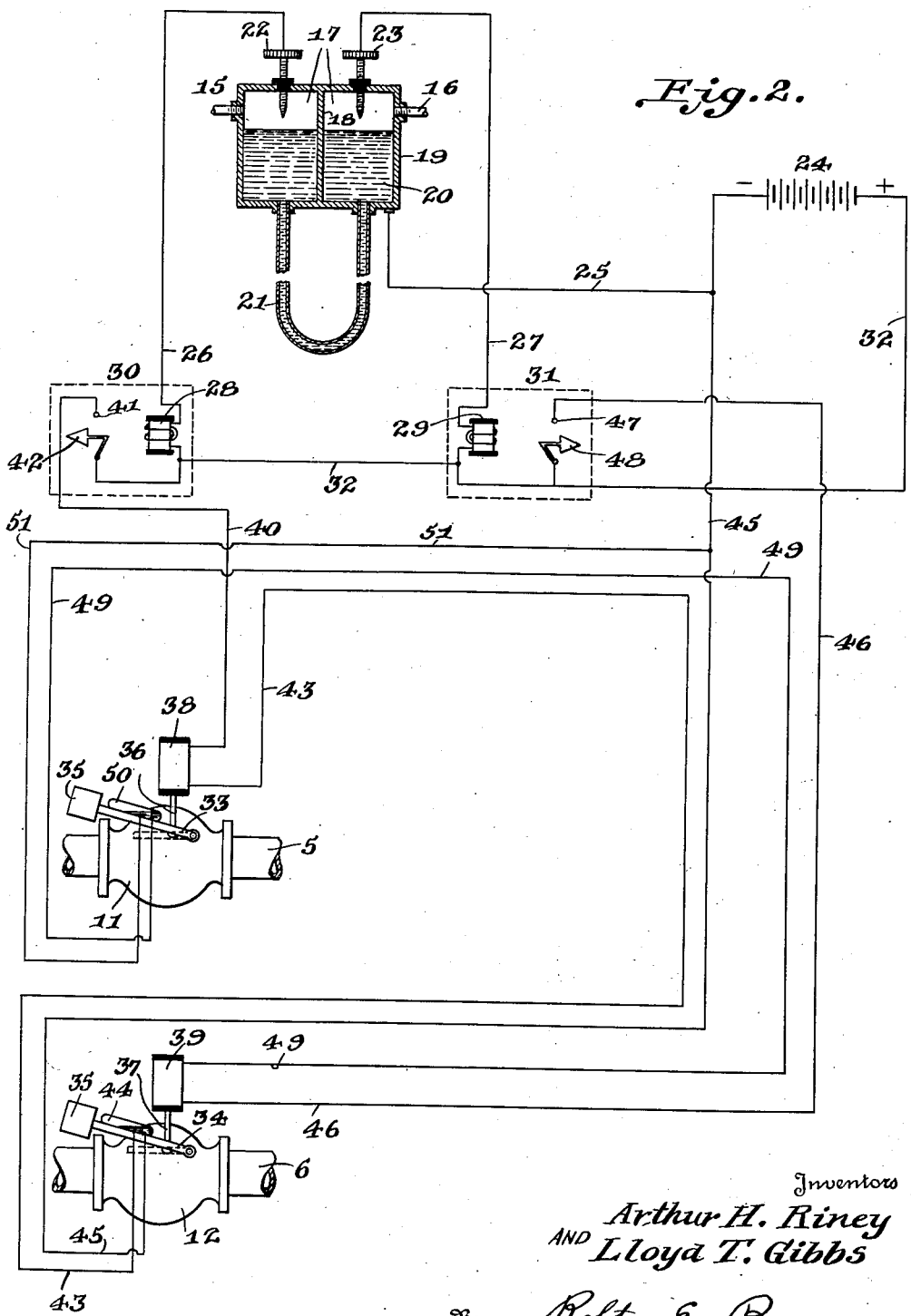
Fig. 2 is a diagrammatic view of the valve controlling installation in each section of the branch pipes.

Referring to the drawings in detail, the numerals 5 and 6 indicate the branch pipes of the system which are coupled at one end by a manifold 7 connected with a suitable pumping station 8 supplied from a suitable source of fluid to be conducted or distributed over the system. As will be understood, the system may extend over distances of great length and in such cases booster pumping stations 8a and 8b may be located at desired points throughout the length thereof so as to maintain the fluid at the desired pressure, the connections between the branch pipes 5 and 6 and the booster pumping stations being established by manifolds 7.

The portions of the parallel branch pipes 5 and 6 lying intermediate widely separated pumping stations 8 and 8a are connected with liquid flow controlling devices designated at 10 and for convenience of reference the portions of said pipe lines lying intermediate said control devices will be hereinafter referred to as "sections". In this manner the relatively long lengths of the parallel branch pipes 5 and 6 are divided into a plurality of pipe line sections which are under the control of the devices 10 and operated to control the flow of fluid through the respective pipes.

Referring in detail to the control device illustrated in Fig. 2, the same is shown to consist of two check valves 11 and 12 interposed in and controlling passage of liquid through the pipes 5 and 6, respectively. The valves 11 and 12 are normally open and permit the free flow of fluid through the branch pipes 5 and 6 during normal operation of the system. Orifice plates 13 and 14 are arranged in the pipes 5 and 6 in the vicinity of the control valves 11 and 12 and pipes 15 and 16 are connected with the pipes 5 and 6 on the down stream side of the orifice plates 13 and 14 and are in communication with chambers 17 at opposite sides of a partition 18 arranged in a closed chamber 19. The chambers 17 are partially filled with a body of mercury 20 which also occupies a pipe 21 connecting the lower portions of the chambers 17, the body of mercury forming a liquid piston moving in response to differential pressures existing in the chambers 17. Under normal pressure conditions in the branch pipes 5 and 6 the level of the mercury body 20 in the chambers is equal, but when the pressure conditions in one of the pipes 5 or 6 varies in respect to that of the other pipe the level of the mercury in the chamber 17 is correspondingly varied.

Adjustable screw contacts 22 and 23 are threaded in the upper portions of the chambers 17 and are provided with pointed lower terminals adapted to make contact with the mercury body 20 when the latter rises in one chamber or the other, according to the differential pressure conditions prevailing in the branch pipes 5 and 6.

A source of electromotive force 24 is provided locally for each section of the branch pipes 5 and 6 and one pole thereof is connected by the conductor 25 with the metallic wall of the chamber 19 and the contact screws 22 and 23 are suitably insulated from the chamber wall so that said screws are only in electrical connection with the negative pole of the battery 24 when the lower terminals of said screws are immersed in the mercury body.

The screws 22 and 23 are connected by conductors 26 and 27 with the coils 28 and 29 of retarded relays indicated generally at 30 and 31. The opposite terminals of the coils 28 and 29 are connected by a common return wire 32 to the positive pole of the battery 24. Thus, when the level of the mercury rises in one or the other of the two chambers 17, one of the contact screws 22 or 23 is immersed therein and the circuit to the coil of one of the retarded relays is thus closed.

The gates of the valves 11 and 12 are connected with arms 33 and 34 which are located externally of the valve casings and are provided with weights 35 which normally tend to swing the armed valves to closed position. During normal operation of the system, however, the valves are retained in open position by triggers 36 and 37 operated by solenoids 38 and 39. One terminal of the coil of the solenoid 38 is connected by a conductor 40 with a contact member 41 of the retarded relay 30 the armature 42 of which is adapted to engage said contact when the relay is energized. The movable contact 42 is connected with the conductor 32 at the positive pole of the battery 24. The opposite terminal of the solenoid 38 is connected by a conductor 43 with one of the contacts of a mercury switch 44 which is attached to the arm 34 of the other valve 12 and the second pole of the mercury switch 44 is connected by a conductor 45 with the negative pole of the battery 24. Thus, during the normal operation of the pipe system the circuit supplying current from the battery 24 to the solenoid 38 is interrupted only at the relay 30, but in case the valve 12 is closed, the movement of the arm 34 will so dispose the mercury switch 44 as to interrupt the electrical connection between the solenoid 38 and the negative pole of the battery 24 and the automatic control of the valve 11 in response to varying pressure conditions in the branch pipe 5 is interrupted.

One pole of the solenoid coil of the valve 12, on the other hand, is connected by a conductor 46 with a contact 47 of its retarded relay 31 the movable armature 48 of which latter is connected with the positive pole of the battery 24 through the conductor 32. The other pole of the solenoid 39 is connected by a conductor 49 with a mercury switch 50 carried by the arm 33 of the valve 11, the other pole of which switch 50 is connected by a conductor 51 with the negative pole of the battery 24 through the conductor 45.

The two valves 11 and 12 thus act mutually to interrupt the circuit to the other valve when one of them has been automatically operated in response to differential pressures existing in the pipe branches 5 and 6.

The sections of the pipe lines 5 and 6 constituted by the portions thereof lying intermediate the automatic control devices 10 are segregated from one another by connecting pipes 53 which are provided adjacent either end with valves 54. Each of the branch pipes 5 and 6 is provided at a point upstream of the connecting pipes 53 with upstream closing check valves 55 which operate to prevent the back flow of fluid through the pipe when the latter are not operating under normal conditions.

At points where it is desired to tap the supply of fluid flowing over the branch pipes 5 and 6, service pipes 56 are connected with the connecting pipes 53, and being thus connected medially between the main branch pipes 5 and 6 the pressure existing in said pipes is maintained in balance.

The sections of the branch pipes lying between the supply pump 8 and the booster pump 8a in Fig. 1 under the control of the several automatic control devices disclosed in this figure are designated at A, B, C and D, and during the normal operation of the system, substantially equal quantities of fluid moving at like velocity are conducted through said pipes. By the provision of relays 30 and 31 of the retarded type, said relays are not operated instantaneously in response to differential pressures in the pipes 5 and 6 such as might be caused by friction in the pipe line, eddy currents and the like. However, when the pressure difference has existed for a period corresponding with that in response to which the retarded relays are calculated to operate, one or the other relay, according to the pipe in which the reduction of pressure occurs, is operated due to the movement of the mercury mass 20 and the rising of the level of the latter within the chamber 17 which is in communication with the branch pipe in which the relatively low pressure exists. The operation of the relay results in closing one or the other of the contacts 42 or 48 and energization of the solenoid 38 or 39 and the relays of the arm 33 or 34 which latter, in falling, closes the gate connected therewith and interrupts the flow of fluid through the branch pipe associated therewith. As the valve arm falls to closed position the mercury switch 44 or 50 is tilted and interrupts the electrical connection between the solenoid of the valve on the other pipe and the negative pole of the battery 24 so that the valve in the undamaged pipe is prevented from closing. Thus, in the case of a break occurring in the pipe 6 of the section B, the valve 12 in said pipe is automatically closed between the sections A and C and the back flow of fluid from the section C to the section B is prevented by the automatic closing of the check valve 55. In this way the section in which the break has occurred is isolated from the remaining sections of the system and the flow of fluid through the section B is carried solely by the pipe 5. Having passed the check valve 55 interposed between the sections B and C, the fluid is conducted through the pipe 53 to the pipe 6 at the downstream side of the damaged section B and is conducted from that point onward through both pipes 5 and 6.

When the leak or other damage to the pipe 6 in the section B is repaired, the valve which has been automatically closed is reopened and the flow of fluid over both branch pipes is resumed.

As will be understood, the relays 30 and 31 may be located in control stations individual to the respective pipe sections under the observation of attendants or, if desired, the several relays may be grouped and located in a central station whereby the attendant may instantly observe when any section of the pipe system is out of order and may instantly determine the location of such section.

What we claim is:

1. A piping system comprising branch pipes for conducting fluids from a point of supply to a point of delivery, a plurality of valves in said pipes at different points in the length thereof dividing said pipes into a plurality of sections, pressure responsive means connected with each pipe section and with the valves therein for operating the latter, and a pipe connecting the branch pipes in each section and establishing communication between said sections, the connecting pipe being adapted, when an abnormal condition of fluid flow exists in one section of one branch pipe, to conduct fluid from the other branch pipe to the first mentioned pipe at the downstream side of the affected section, and fluid control means located at each section at the upstream side of said connecting pipe preventing the flow of fluid from said connecting pipe into said affected section.

2. A piping system comprising a plurality of branch pipes for conducting fluids from a point of supply to a point of delivery, a plurality of valves in each of said pipes at different points in the length thereof dividing said pipes into a plurality of sections, pressure responsive means connected with each pipe section and with the valves therein for operating the latter, a connecting pipe establishing communication between the branch pipes in each section adapted, when an abnormal condition of fluid flow exists in one section of one branch pipe, to conduct fluid from the other branch pipe to the first mentioned branch pipe at the downstream side of the affected section, and check valves in the branch pipes located upstream from the connecting pipes.

3. A piping system comprising branch pipes for conducting fluids from a point of supply to a point of delivery, a plurality of valves in said pipes at different points in the length thereof dividing said pipes into a plurality of sections, pressure responsive means connected with each pipe section and with the valves therein for operating the latter, pipes connected across and communicating with the branch pipes, and service branch pipes connected with the last mentioned pipes.

4. A piping system comprising branch pipes for conducting fluids from a point of supply to a point of delivery, a plurality of valves in said pipes at different points in the length thereof dividing said pipes into a plurality of sections, pressure responsive means connected with each pipe section and with the valves therein for operating the latter, pipes connected across and communicating with the branch pipes, service branch pipes connected with the last mentioned pipes, and upstream closing check valves located in the branch pipes upstream of the second mentioned pipes.

5. In combination, branch pipes for conducting fluid from a point of supply to a point of delivery, a valve interposed in each pipe controlling the flow of fluid therethrough, and electrically operated pressure responsive means connected with each pipe section and with the valve therein for operating the latter, said pressure responsive means including a circuit, a pressure influenced circuit closing device and a retarded relay.

6. In combination, branch pipes for conducting fluid from a point of supply to a point of delivery, a valve interposed in each pipe controlling the flow of fluid therethrough, and electrically operated pressure responsive means connected with each pipe section and with the valve therein for operating the latter, said pressure responsive means including a circuit and a pressure influenced circuit closing device, means under the control of said circuit to close said valves, and means interposed in said first mentioned circuit for delaying the closing of the valves for a predetermined time interval following closing of said circuit.

7. In combination, branch pipes for conducting fluid from a point of supply to a point of delivery, valves in said pipes, electrically operated means for closing said valves, and electrically retarded pressure responsive means connected with each pipe and with the electrically operated means to set the latter in operation.

8. In combination, branch pipes for conducting fluid from a point of supply to a point of delivery, valves in said pipes, electrically operated means for closing said valves, and electrical pressure responsive means connected with each pipe and with the electrically operated means to set the latter in operation, said second mentioned means including a retarding device for delaying operation of the electrically operated means.

9. In combination, branch pipes for conducting fluid from a point of supply to a point of delivery, valves in said pipes, electrically operated means for closing said valves, electrical pressure responsive means connected with each pipe and with the electrically operated means to set the latter in operation, said last mentioned means including an electric circuit for each pipe, a fluid contact element moving in response to pressure variations in said pipe, and a retarded relay in said circuit controlling the electrically operated means.

ARTHUR H. RINEY.
LLOYD T. GIBBS.